United States Patent [19]
Konno et al.

[11] Patent Number: 6,028,738
[45] Date of Patent: *Feb. 22, 2000

[54] MAGNETIC DISK DRIVE DD MOTOR

[75] Inventors: Makoto Konno; Hisashi Shibata, both of Yamagata, Japan

[73] Assignee: Mitsumi Electric Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/884,088

[22] Filed: Jun. 27, 1997

[30] Foreign Application Priority Data

Jun. 29, 1996 [JP] Japan .................................. 8-188327

[51] Int. Cl.[7] .................................................. G11B 17/022
[52] U.S. Cl. .......................................................... 360/99.08
[58] Field of Search ............................. 360/99.04, 99.05, 360/99.08, 99.12

[56] References Cited

U.S. PATENT DOCUMENTS

| | | | |
|---|---|---|---|
| 4,680,655 | 7/1987 | Sugawara | 360/97 |
| 5,245,235 | 9/1993 | Nagai et al. | 310/67 R |
| 5,450,260 | 9/1995 | Sakaguchi et al. | 360/99.08 |
| 5,777,415 | 7/1998 | Suzuki et al. | 310/156 |
| 5,798,886 | 8/1998 | Komatsu et al. | 360/99.05 |

FOREIGN PATENT DOCUMENTS

8-091814  4/1996  Japan .

*Primary Examiner*—Robert S. Tupper
*Attorney, Agent, or Firm*—Whitham, Curtis & Whitham

[57] ABSTRACT

A magnetic disk drive DD motor 20 including: a printed board 22 that is mounted on an upper surface of a frame 21 of a magnetic disk drive and that has a coil formed on a surface thereof; a spindle shaft 23 that is inserted into a through hole 22*a* formed in the frame and the printed board and that is supported so as to be vertical and rotatable with respect to the frame; a rotor that is constructed of a rotor case 24*a* mounted on the spindle shaft so as to confront the coil on the printed board and of a ringlike rotor magnet 24*b* mounted inside the rotor case; and a disklike disk table 25 that is fixed to the spindle shaft on an upper side of the frame and that supports a magnetic disk. In such magnetic disk drive DD motor 20, the rotor case constituting the rotor is mounted onto the spindle shaft by a bearing portion 25*a* on the upper side of the frame while formed integrally with the disk table, and the bearing portion is formed integrally with the rotor case, the disk table, and the spindle shaft by molding a resin in the middle of the disk table, the resin having a magnetic powder a mixed therein.

19 Claims, 6 Drawing Sheets

MAGNETIC DISK DRIVE DD MOTOR

BACKGROUND OF THE INVENTION

1. Field of the invention

The present invention relates to DD motors (direct drive motors) used in magnetic disk drives for driving magnetic disks.

2. Related art

Figure 4:
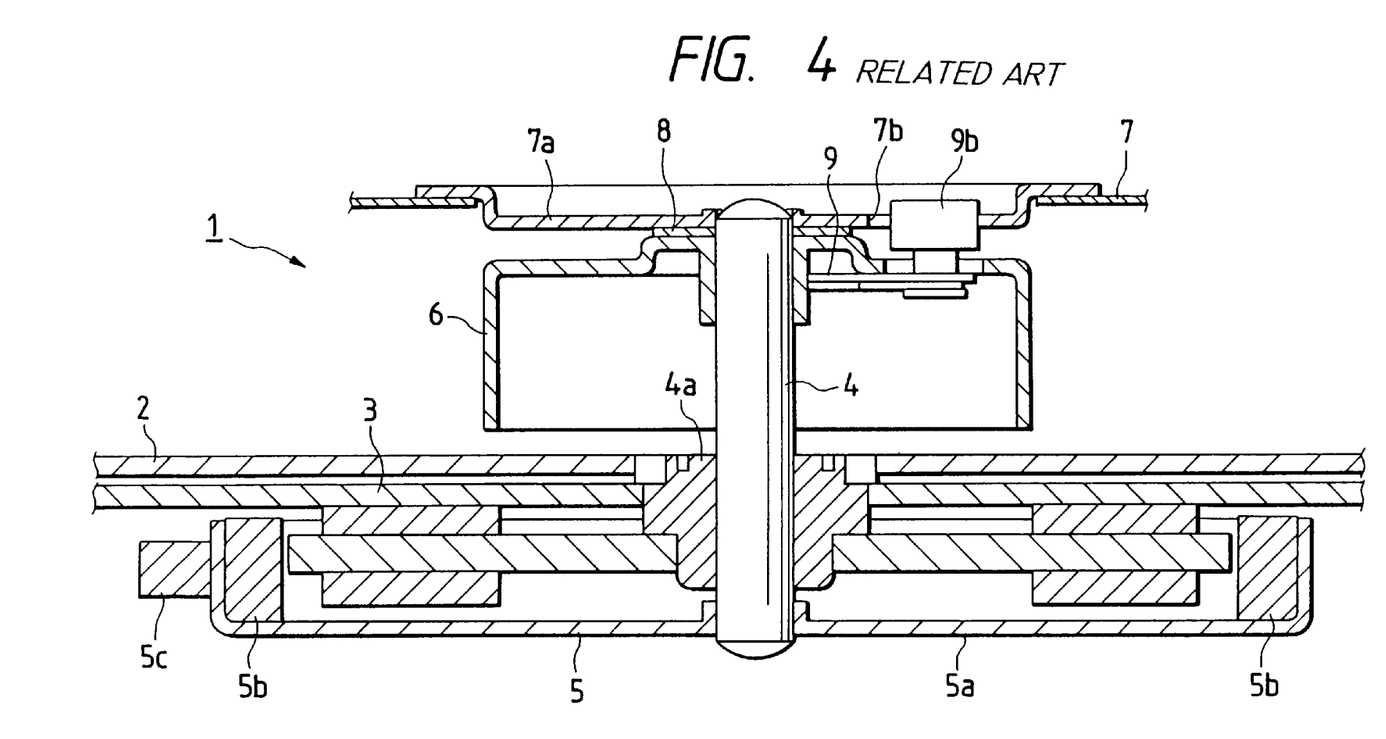
FIG. 4 is a sectional view outlining a main portion of an exemplary conventional floppy disk drive DD motor.
Figure 5:
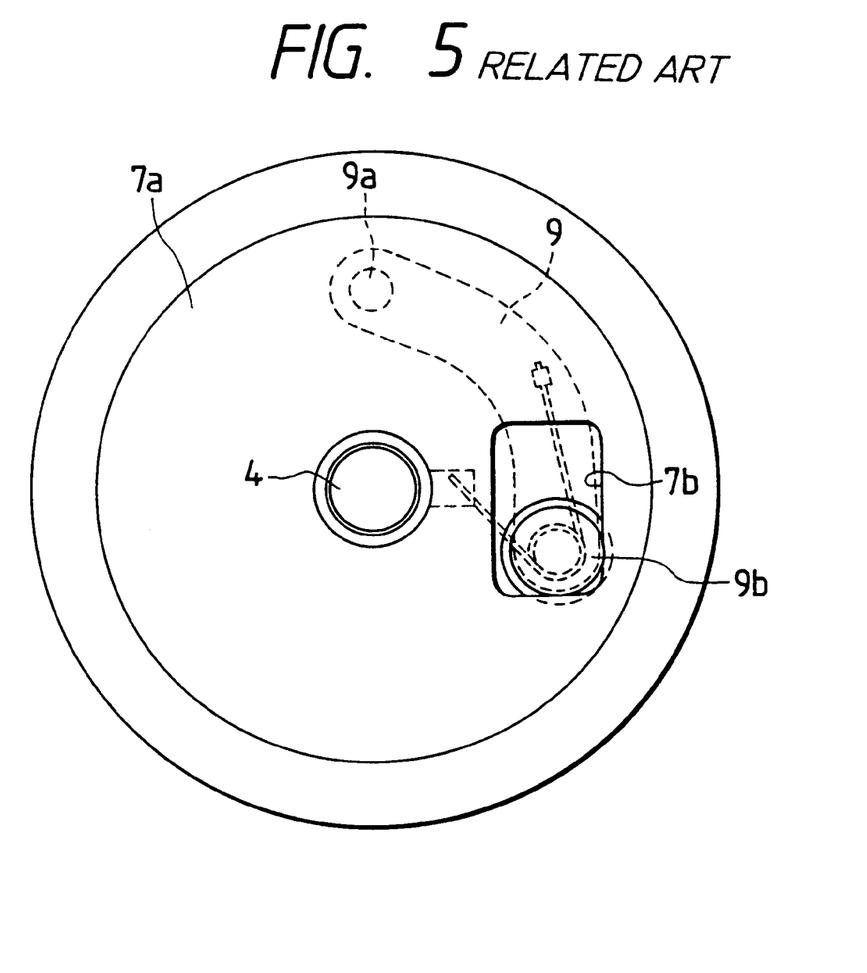
FIG. 5 is a front view showing a floppy disk and a disk table portion in a conventional floppy disk drive.

As shown in FIGS. 4 and 5, a conventional magnetic disk (floppy disk) drive DD motor is designed to be disposed on a lower surface of a frame of a magnetic disk drive (the surface opposite to the surface on the magnetic disk side).

That is, in FIGS. 4 and 5, a DD motor 1 has a printed board 3 disposed on a frame 2, a spindle shaft 4, a rotor 5, and a disk table 6.

The printed board 3 has a coil (not shown) formed of a conductive pattern on a surface thereof.

The spindle shaft 4 is not only inserted into a through hole formed in the frame 2 and the printed board 3, but also supported by a bearing 4a so as to be vertical and rotatable with respect to the frame 2.

The rotor 5 is set into the lower end portion of the spindle shaft 4, and has a circular rotor case 5a that has a flange portion extending toward the frame 2 from the circumferential edge of the rotor case, a ringlike rotor magnet 5b mounted on the frame 2 side of the rotor case 5a, and a rotational direction detecting index magnet 5c mounted on the outer circumferential surface of the rotor case 5a.

The disk table 6 is disposed opposite to the rotor 5 with the frame 2 interposed therebetween, and is mounted onto an upper end portion of the spindle shaft 4. The upper surface of the disk table 6 protrudes, and not only supports a magnetic disk 7, but also has a chucking plate 8 formed of a magnetic substance for chucking the magnetic disk 7. As shown in FIG. 5, one end of the chucking arm 9 for chucking the magnetic disk 7 is oscillatably supported on the circumferential edge of the upper surface of the disk table 6 by a support pin 9a. A roller 9b engageable with a window 7b of a hub 7a of the magnetic disk 7 is rotatably disposed on the other end of the chucking arm 9.

According to the thus constructed magnetic disk drive DD motor 1, the magnetic disk 7 is fixed and held on the disk table 6 while disposed on the disk table 6 and chucked by the chucking plate 8.

When a drive current is applied to the coil formed on the printed board 3 under this condition, a magnetic field generated in the coil acts mutually with a magnetic field of the rotor magnet 5b of the rotor 5, so that the rotor 5 rotates together with the spindle shaft 4. Then, the chucking roller 9b of the chucking arm 9 engages with the window 7b of the hub 7a of the magnetic disk 7, so that the magnetic disk 7 is driven to rotate.

However, in the thus constructed magnetic disk drive DD motor 1, the rotor 5 and the disk table 6 are not only formed in separate pieces, but also mounted onto the spindle shaft 4 so as to interpose the frame 2 therebetween.

Further, the rotor 5 is not only set into the spindle shaft 4 by fixing screws, but also has the rotor magnet 5b and the index magnet 5c, which are formed independently of each other, attached thereto by an adhesive or the like.

Still further, the chucking plate 8 is mounted on the disk table 6 with an adhesive or the like, and one end of the chucking arm 9 for chucking the magnetic disk 7 is supported on the disk table 6 with the support pin 9a so as to be oscillatable, e.g., by self-locking or the like.

Therefore, the number of parts of the DD motor 1 as a whole is increased, which in turn has imposed the problem of elevated parts and assembling costs.

SUMMARY OF THE INVENTION

The present invention has been made in view of the aforementioned circumstances. The object of the present invention is therefore to provide a magnetic disk drive DD motor that can reduce parts costs as well as assembling costs with a simple construction.

To achieve the above object, a first aspect of the present invention is applied to a magnetic disk drive DD motor that includes: a printed board being mounted on an upper surface of a frame of a magnetic disk drive and having a coil formed on a surface thereof; a spindle shaft being inserted into a through hole formed in the frame and the printed board and being supported so as to be vertical and rotatable with respect to the frame; a rotor being constructed of a rotor case and a ringlike rotor magnet, the rotor case being mounted on the spindle shaft so as to confront the coil on the printed board, the rotor magnet being mounted inside the rotor case; a disklike disk table, fixed to the spindle shaft on an upper side of the frame, for supporting a magnetic disk. In such magnetic disk drive DD motor, the rotor case constituting the rotor is mounted onto the spindle shaft by a bearing portion on the upper side of the frame while formed integrally with the disk table; and the bearing portion is formed integrally with the rotor case, the disk table, and the spindle shaft by molding a resin in the middle of the disk table, the resin having a magnetic powder mixed therein.

To achieve the above object, a second aspect of the present invention is also applied to a magnetic disk drive DD motor that includes: a printed board being mounted on an upper surface of a frame of a magnetic disk drive and having a coil formed on a surface thereof; a spindle shaft being inserted into a through hole formed in the frame and the printed board and being supported so as to be vertical and rotatable with respect to the frame; a rotor being constructed of a rotor case and a ringlike rotor magnet, the rotor case being mounted on the spindle shaft so as to confront the coil on the printed board, the rotor magnet being mounted into the rotor case; a disklike disk table, fixed to the spindle shaft on an upper side of the frame, for supporting a magnetic disk. In such magnetic disk drive DD motor, the rotor case constituting the rotor is mounted onto the spindle shaft by a bearing portion on the upper side of the frame while formed integrally with the disk table; and the bearing portion has a projecting stepped portion in the middle thereof, and is formed integrally with the rotor case, the disk table, and the spindle shaft by first molding a resin in the middle of the disk table, the resin having a magnetic powder mixed therein, and then magnetizing the magnetic powder in the projected stepped portion.

To achieve the above object, a third aspect of the present invention is also applied to a magnetic disk drive DD motor that includes: a printed board being mounted on an upper surface of a frame of a magnetic disk drive and having a coil formed on a surface thereof; a spindle shaft being inserted into a through hole formed in the frame and the printed board and being supported so as to be vertical and rotatable with respect to the frame; a rotor being constructed of a rotor case and a ringlike rotor magnet, the rotor case being mounted on the spindle shaft so as to confront the coil on the printed board, the rotor magnet being mounted into the rotor case; a disklike disk table, fixed to the spindle shaft on an upper side of the frame, for supporting a magnetic disk. In such magnetic disk drive DD motor, the disk table for supporting the magnetic disk has a chucking arm for chucking the magnetic disk, and the chucking arm is fixed by support pins; and the support pins are formed integrally with the rotor case and the disk table by molding a resin.

To achieve the above object, a fourth aspect of the present invention is applied to a magnetic disk drive DD motor that includes: a printed board being mounted on an upper surface of a frame of a magnetic disk drive and having a coil formed on a surface thereof; a spindle shaft being inserted into a through hole formed in the frame and the printed board and being supported so as to be vertical and rotatable with respect to the frame; a rotor being constructed of a rotor case and a ringlike rotor magnet, the rotor case being mounted on the spindle shaft so as to confront the coil on the printed board, the rotor magnet being mounted into the rotor case; a disklike disk table, fixed to the spindle shaft on an upper side of the frame, for supporting a magnetic disk. In such magnetic disk drive DD motor, the rotor magnet is formed integrally with the rotor case by first molding a resin having a magnetic powder mixed therein, and then magnetizing the magnetic powder.

To achieve the above object, a fifth aspect of the present invention is also applied to a magnetic disk drive DD motor that includes: a printed board being mounted on an upper surface of a frame of a magnetic disk drive and having a coil formed on a surface thereof; a spindle shaft being inserted into a through hole formed in the frame and the printed board and being supported so as to be vertical and rotatable with respect to the frame; a rotor being constructed of a rotor case and a ringlike rotor magnet, the rotor case being mounted on the spindle shaft so as to confront the coil on the printed board, the rotor magnet being mounted into the rotor case; a disklike disk table, fixed to the spindle shaft on an upper side of the frame, for supporting a magnetic disk. In such magnetic disk drive DD motor, an index magnet for detecting rotation of the rotor is disposed, the index magnet being formed by first molding a resin having a magnetic powder mixed therein over an outer circumferential surface of the rotor case, and then magnetizing the magnetic powder.

The DD motors according to the present invention can achieve the object and provide advantages effectively if preferably all the technical aspects from the first to the fifth are combined together or if two to five technical aspects are combined together.

According to the first aspect of the present invention, a rotor case constituting a rotor is mounted onto a spindle shaft by a bearing portion on an upper side of a frame while formed integrally with a disk table, and the bearing portion is formed integrally with the rotor case, the disk table, and the spindle shaft by molding a resin in the middle of the disk table, the resin having a magnetic powder mixed therein. Therefore, the rotor case and the disk table are mounted integrally with each other onto the spindle shaft at the time of assembling the DD motor. Hence, there is no need for assembling the individual parts separately.

According to the second aspect of the present invention, the rotor case constituting the rotor is mounted onto the spindle shaft by the bearing portion on the upper side of the frame while formed integrally with the disk table, and the bearing portion has a projecting stepped portion in the middle thereof, and is formed integrally with the rotor case, the disk table, and the spindle shaft by first molding a resin in the middle of the disk table, the resin having a magnetic powder mixed therein, and then magnetizing the magnetic powder in the projected stepped portion. Therefore, the projecting stepped portion integrally formed in the middle of the bearing portion is magnetized with the magnetic powder magnetized. Hence, a separate chucking plate for chucking the magnetic disk as in the conventional example can be dispensed with.

According to the third aspect of the present invention, the disk table for supporting the magnetic disk has a chucking arm for chucking the magnetic disk, and the chucking arm is fixed by support pins, and the support pins are formed integrally with the rotor case and the disk table by molding a resin. Therefore, the support pins can be molded with ease.

According to the fourth aspect of the present invention, a rotor magnet is formed integrally with the rotor case by first molding a resin having a magnetic powder mixed therein, and then magnetizing the magnetic powder. Therefore, the rotor magnet can be molded with ease.

According to the fifth aspect of the present invention, an index magnet for detecting rotation of the rotor is disposed, the index magnet being formed by first molding a resin having a magnetic powder mixed therein over an outer circumferential surface of the rotor case, and then magnetizing the magnetic powder. Therefore, the rotor magnet can be molded with ease.

Hence, not only the number of parts constituting a DD motor is reduced, which in turn contributes to reducing parts costs, but also the assembling operation can be facilitated, which in turn contributes to curtailing the number of assembling steps, reducing assembling costs, and hence reducing parts costs.

Each of the first to fifth aspects of the invention is characterized as molding a resin having a magnetic powder mixed therein. As a result of such construction, the present invention can provide effective operations and advantages by each of the first to fifth aspects of the invention, or when two or more aspects of the invention or the invention including all the five aspects are combined together.

DETAILED DESCRIPTION OF THE PREFERRED EMBODIMENTS

The present invention will now be described in detail with reference to a mode of embodiment shown in the drawings.

First Embodiment

Figure 6:
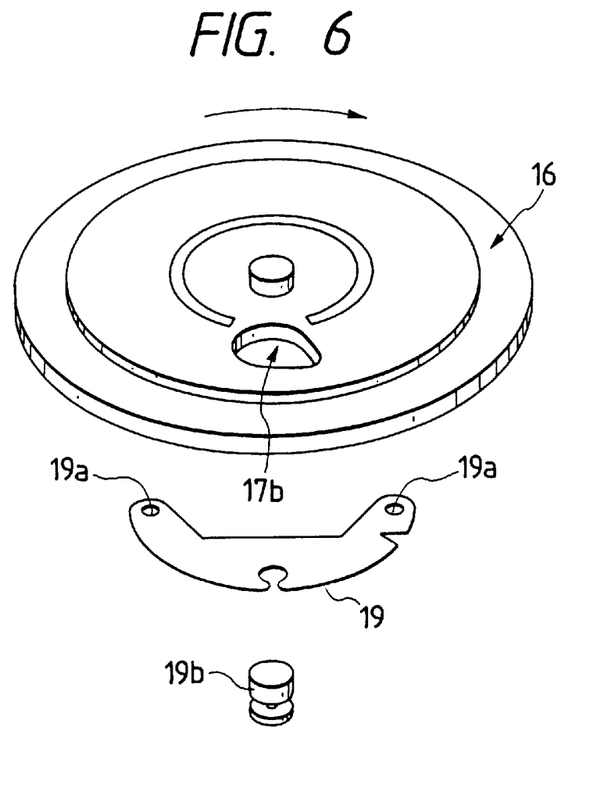
FIG. 6 is an exploded perspective view showing the disk table portion of the floppy disk drive in a first embodiment of the present invention.
Figure 7:
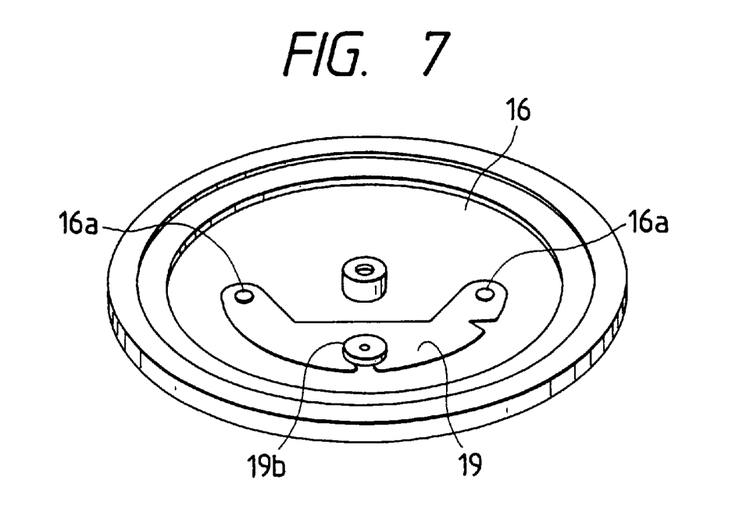
FIG. 7 is a bottom side perspective view showing a condition in which parts shown in FIG. 6 have been assembled.

As shown in FIGS. 6 and 7, according to a first embodiment, a chucking mechanism of a magnetic disk drive that includes: a disk table 16 that has an opening 17b; an arm 19 that is attached to a lower surface of the disk table 16; and a roller 19b that is disposed on the arm 19 and that projects from the upper surface of the disk table 16 through the opening 17b. In such chucking mechanism, the arm 19 has elasticity and is fixed directly to the disk table 16 at least at one place on a portion remote from the roller 19b, and the roller 19b is disposed so as to be movable at least in a radial direction of the disk table 16 within the opening 17b. As a specific example for fixing the arm 19 directly to the disk table 16, a technique in which projections 16a of the disk table are inserted into holes 19a formed in the arm 19 and directly fixed with an adhesive is proposed. Therefore, compared with the example described in the prior art, technology that can dispense with the operation of caulking the arm so that the arm can be oscillatably supported, and that can curtail the number of parts, facilitate the assembling operation, and hence reduce the cost of manufacture is proposed.

Second Embodiment

Figure 1:
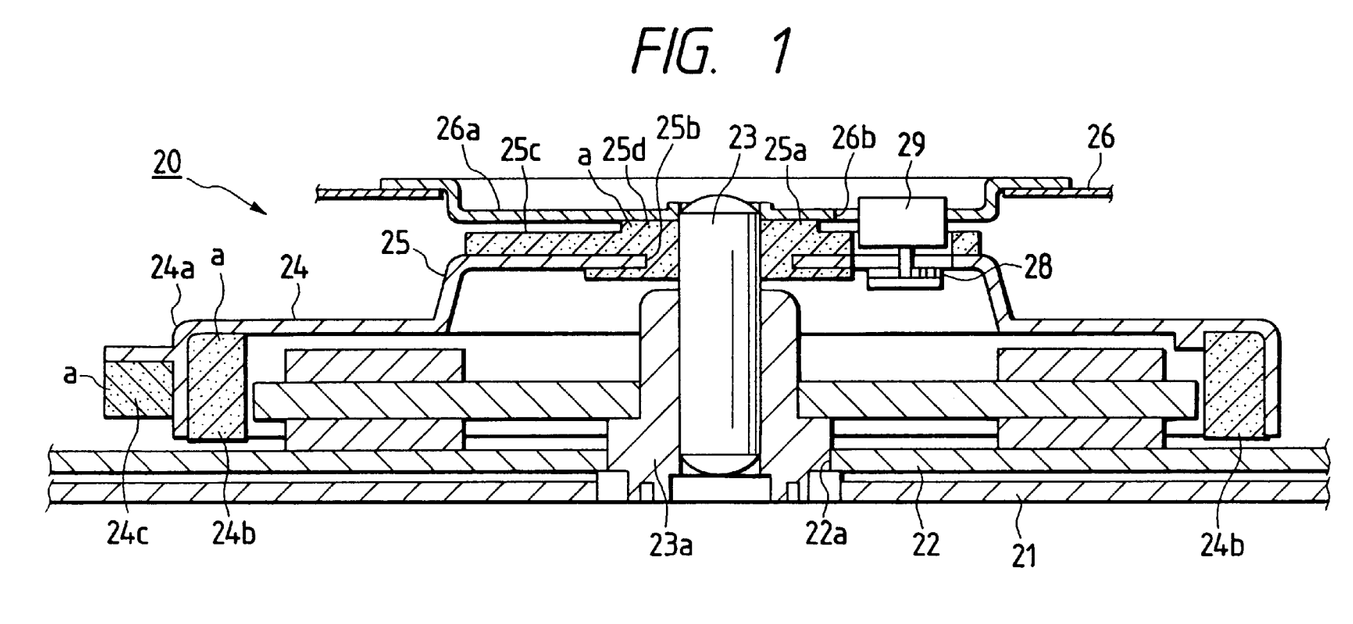
FIG. 1 is a sectional view outlining a main portion of a floppy disk drive DD motor, which is a second embodiment of the present invention.

FIG. 1 shows a second embodiment to which a magnetic disk drive DD motor of the present invention is applied to a floppy disk drive.

In FIG. 1, a floppy disk drive DD motor 20 includes a printed board 22 disposed on a frame 21 of a floppy disk drive (not shown), a spindle shaft 23, a rotor 24, and a disk table 25.

The printed board 22 has, on a surface thereof, a coil (not shown) formed by a conductive pattern.

The spindle shaft 23 is not only inserted into a through hole 22a formed in the frame 21 and the printed board 22, but also supported by a frame side bearing 23a so as to be vertical and rotatable with respect to the frame 21.

The rotor 24 is made of iron, formed by press working, and fixed to an upper end portion of the spindle shaft 23 by a bearing portion 25a that will be described later. The rotor 24 has a flange portion extending downward toward the frame 21 from the circumferential edge thereof, and further includes: a circular rotor case 24a serving also as a magnetic shielding member; a ringlike rotor magnet 24b attached to the inner surface of the rotor case 24a on the frame 21 side; and a rotational direction detecting index magnet 24c attached to the outer circumferential surface of the rotor case 24a.

Figure 2:
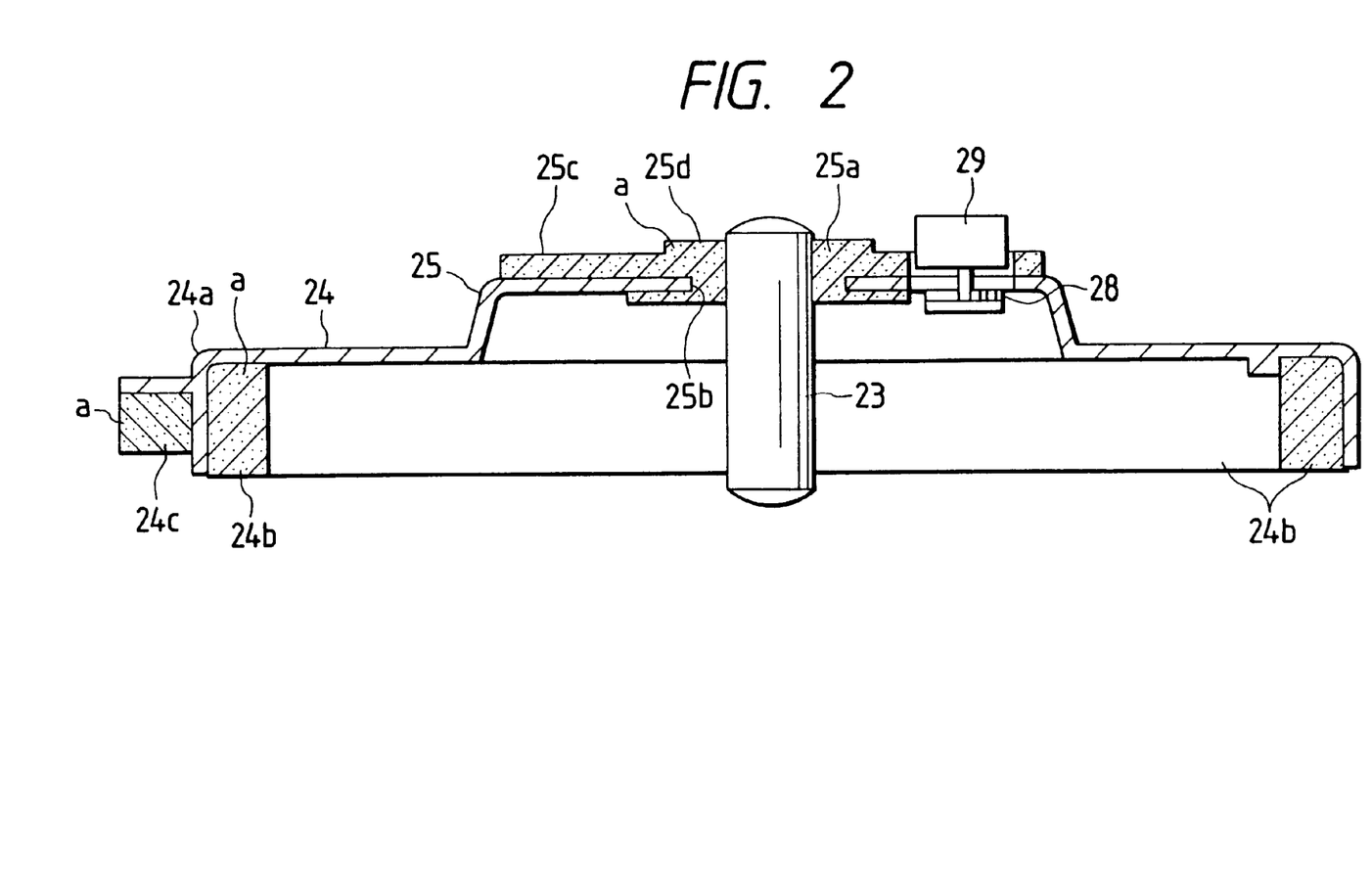
FIG. 2 is a sectional view outlining a rotor portion used to the DD motor shown in FIG. 1.

The rotor case 24a of the rotor 24 is formed integrally with the disk table 25 by press working. At the center of the disk table 25 is a shaft hole 25b that is larger than the diameter of the spindle shaft 23. The bearing portion 25a is formed integrally with the rotor case 24a, the disk table 25, and the spindle shaft 23 as shown in FIG. 2 by molding with a resin into the shaft hole 25b, the resin having a magnetic powder mixed therein. It may be noted that an extended collar portion 25c is formed over the upper surface of the disk table 25 so as to cover the disk table 25 in order to increase the holding power of the bearing portion 25a that is made by resin molding.

The bearing portion 25a is molded with a resin in such a manner that a projecting stepped portion 25d is arranged in the middle thereof. Thus, the projecting stepped portion 25d can be formed integrally with the bearing portion 25a, the disk table 25, the rotor case 24a, and the spindle shaft 23 extremely easily as shown in FIG. 2. After a resin having a magnetic powder a mixed therein has been molded, the bearing portion 25a is magnetized by magnetizing such magnetic powder a. The bearing portion 25a can hold a hub 26a of a magnetic disk 26 so as to be chucked. Therefore, unlike the conventional example in which the chucking plate 8, which is a separate member from the disk table 6 shown in FIG. 4, must be attached and adhesively fixed, the separate parts and the process of assembling such parts can be dispensed with, which in turn reduces the cost of manufacture.

Figure 3A:
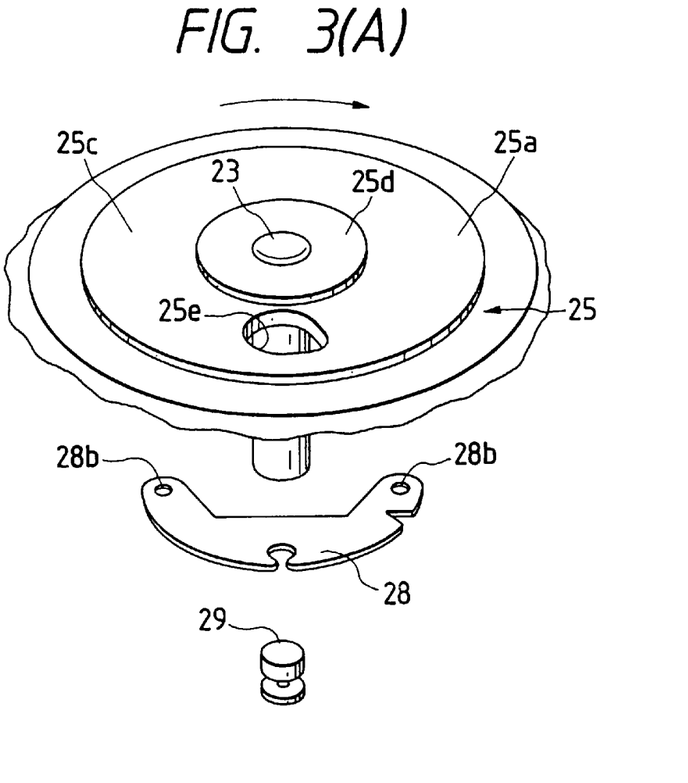
FIG. 3 is a diagram showing a disk table portion of the DD motor shown in FIG. 1, in which part (A) is an exploded perspective view of the disk table portion and part (B) is a bottom side perspective view showing an assembled condition.
Figure 3B:
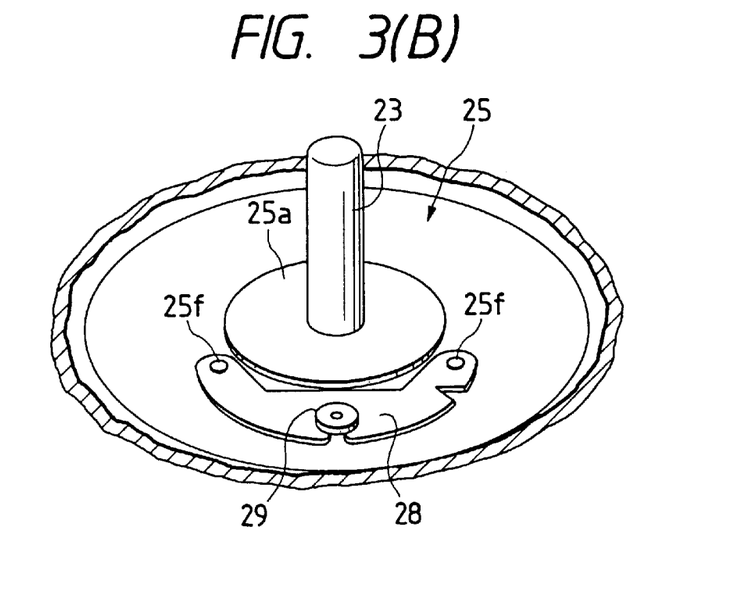

As shown in FIG. 3, the disk table 25 is constructed so that both ends of a chucking arm 28 being formed of a thin plate for chucking the floppy disk 26 and having elasticity are directly fixed to a portion of the inner circumferential edge of the disk table 25 by support pins 28a, the portion being remote from a roller 29 that will be described later. The chucking roller 29 engageable with a window 26b of the hub 26a of the floppy disk 26 is arranged so as to freely play within an opening 25e of the disk table 25 and is movable in a radial direction of the disk table 25. As shown in FIG. 3 (B), the support pins 28a are arranged in such a manner that: holes 28b of the chucking arm 28 are overlapped on holes (not shown) formed in the disk table 25; and the resin having the magnetic powder mixed therein is charged into both holes to be molded, so that support pins 25f, each pin 25f having collars on the chucking arm mounting side and on the chucking side of the floppy disk 26 is formed. The chucking arm 28 is thus fixed to the disk table 25.

In the case shown in the drawings, the rotor magnet 24b is formed integrally with the rotor case 24a by first molding the resin having the magnetic powder a mixed therein and then magnetizing the magnetic powder a.

Further, in the case shown in the drawings, the index magnet 24c is attached so as to be magnetically shielded by forming a recessed portion on the flange portion of the rotor case 24a, and is formed integrally with the rotor case 24a, similarly to the rotor magnet 24b by first molding the resin having the magnetic powder a mixed therein and then magnetizing the magnetic powder a.

The DD motor 20 according to the mode of embodiment of the present invention is constructed as described above. The floppy disk 26 is placed on the disk table 25 and is fixed and held on the disk table 25 while chucked by the projecting stepped portion 25d of the disk table 25.

When a drive current is applied to the coil formed on the printed board 22 under this condition, a magnetic field generated in the coil acts mutually with a magnetic field of the rotor magnet 24b of the rotor 24, so that the rotor 24 rotates together with the spindle shaft 23. Then, the chucking roller 29 of the chucking arm 28 engages with the window 26b of the hub 26a of the floppy disk 26, so that the floppy disk 26 is driven to rotate.

At this juncture, the index magnet 24c disposed on the rotor 24 detects an induction current to be generated on the rotation detecting coil (not shown) by repeating to move closer to and move away from the rotation detecting coil disposed so as to confront the outer circumferential surface of the rotor case 24a, so that the rotation of the rotor 24 can be detected.

Here, the rotor 24 and the disk table 25 are formed integrally with each other in the DD motor 20. As a result of this construction, when the rotor 24 is mounted onto the spindle shaft 23, so is the disk table 25. Therefore, the number of parts can be reduced, which in turn contributes to facilitating the assembling operation.

At this juncture, the bearing portion 25a and the projecting stepped portion 25d are formed integrally with the spindle shaft 23 in the middle of the rotor 24 and the disk table 25 by molding using the resin having the magnetic powder mixed therein. Therefore, when the rotor 24 is mounted onto the spindle shaft 23, so is the disk table 25. Further, the projecting stepped portion 25d is formed integrally by first molding the resin having the magnetic powder a mixed therein and then magnetizing the magnetic powder a. Therefore, the number of parts can be reduced, which in turn contributes to facilitating the assembling operation.

Further, the support pins 25f that serve to fix both ends of the chucking arm 28 directly to the disk table 25 are formed similarly to the process of molding, onto the upper surface of the disk table 25, the bearing portion 25a and the projecting stepped portion 25d with the resin having the magnetic powder a mixed therein. As a result, the number of assembling steps can be further reduced, which in turn contributes to facilitating the assembling operation.

Still further, the rotor magnet 24b and the index magnet 24c are formed integrally with the rotor case 24a similarly to the aforementioned processes by first molding the resin having the magnetic powder a mixed therein and then magnetizing the magnetic powder a. As a result, the number of parts can be further reduced, which in turn reduces the assembling steps and hence contributes to facilitating the assembling operation.

While a case of the floppy disk drive DD motor 20 has been described in the aforementioned mode of embodiment, it is apparent that the present invention can be applied not only to such case, but also to other magnetic disk DD motors.

As described in the foregoing, according to the present invention, the disk table is formed integrally with the rotor case that constitutes the rotor. Therefore, not only the number of parts constituting a DD motor can be reduced, which in turn contributes to reducing parts costs, but also the assembling operation is facilitated, which in turn contributes to reducing the number of assembling steps as well as the assembling time, and hence contributes to reducing assembling costs.

Further, according to the present invention, the bearing portion, the projecting stepped portion, the support pins of the chucking arm for chucking the magnetic disk, the drive rotor magnet, and the index magnet for detecting the rotation of the rotor are individually combined with the rotor case, molded with the resin having the magnetic powder mixed therein, and thereafter finally formed by magnetizing the magnetic powder. As a result, the number of parts can be further reduced, which in turn contributes to reducing parts costs as well as assembling costs.

Hence, the present invention can provide an extremely excellent magnetic disk drive DD motor that can reduce parts costs as well as assembling costs with a simple construction.

What is claimed is:

1. A magnetic disk drive motor comprising:
   a printed board mounted on an upper surface of a frame of a magnetic disk drive and having a coil formed on a surface thereof;
   a spindle shaft inserted into a through hole formed in the frame and the printed board and being supported so as to be vertical and rotatable with respect to the frame;
   a rotor including a rotor case and a ringlike rotor magnet, the rotor case mounted on the spindle shaft so as to confront the coil on the printed board, the rotor magnet mounted inside the rotor case;
   a disklike disk table having a shaft hole larger than a diameter of the spindle shaft and being integral with the rotor case, the disklike disk table supporting a magnetic disk,
   a bearing portion formed integrally within the shaft hole of the disklike disk table and about the shaft, the bearing portion further having an extended collar being formed on an upper surface of the disklike disk table so as to increase a holding strength of the bearing portion; and
   the bearing portion is formed integrally with the rotor case, the disk table, and the spindle shaft by molding a resin, the resin having a magnetic powder mixed therein.

2. A magnetic disk drive motor comprising:
   a printed board mounted on an upper surface of a frame of a magnetic disk drive and having a coil formed on a surface thereof;
   a spindle shaft inserted into a through hole formed in the frame and the printed board and being supported so as to be vertical and rotatable with respect to the frame;
   a rotor including a rotor case and a ringlike rotor magnet, the rotor case being mounted on the spindle shaft so as to confront the coil on the printed board, the rotor magnet being mounted into the rotor case;
   a disklike disk table having a shaft hole larger than a diameter of the spindle shaft and being integral with the rotor case, the disklike disk table supporting a magnetic disk,
   a bearing portion formed integrally within the shaft hole of the disk table, and the bearing portion has a projecting stepped portion in the middle thereof and an
   extended collar formed on an upper surface of the disklike disk table, and is formed integrally with the rotor case, the disk table, and the spindle shaft by first molding a resin in the middle of the disk table, the resin having a magnetic powder mixed therein, and then magnetizing the magnetic powder in the projected stepped portion.

3. A magnetic disk drive motor according to claim 2, wherein the rotor case including the rotor is mounted onto the spindle shaft by a bearing portion on the upper side of the frame while formed integrally with the disk table; and
   the bearing portion is formed integrally with the rotor case, the disk table, and the spindle shaft by molding a resin in the middle of the disk table, the resin having a magnetic powder mixed therein.

4. A magnetic disk drive motor comprising:
   a printed board being mounted on an upper surface of a frame of a magnetic disk drive and having a coil formed on a surface thereof;
   a spindle shaft being inserted into a through hole formed in the frame and the printed board and being supported so as to be vertical and rotatable with respect to the frame;
   a rotor including a rotor case and a ringlike rotor magnet, the rotor case being mounted on the spindle shaft so as to confront the coil on the printed board, the rotor magnet being mounted into the rotor case;
   a disklike disk table being integral with the rotor case, fixed to the spindle shaft on an upper side of the frame, for supporting a magnetic disk,
   a chucking roller extending freely into an opening of the disklike disk table and being moveable radially therein;
   a chucking arm for chucking the magnetic disk, the chucking arm having opposing extensions each having an aperture at a distal end therein and a notched portion between the apertures, the chucking arm is fixed to the disklike table by support pins extending through the apertures of the opposing extensions, the chucking arm being fitted within the notched portion of the chucking roller;

the support pins are formed integrally with the rotor case and the disk table by molding a resin and forming collars; and a bearing portion formed integrally with the rotor case, the disk table, and the spindle shaft by molding a resin, the resin having a magnetic powder mixed therein, the rotor case including the rotor being mounting onto the spindle shaft by the bearing on the upper side of the frame.

5. A magnetic disk drive motor according to claim 4, wherein the bearing portion has a projecting stepped portion in the middle thereof, and is formed integrally with the rotor case, the disk table, and the spindle shaft by first molding the resin in the middle of the disk table, the resin having the magnetic powder mixed therein, and then magnetizing the magnetic powder in the projected stepped portion.

6. A magnetic disk drive motor according to claim 4, wherein the bearing portion has a projecting stepped portion in the middle thereof, and is formed integrally with the rotor case, the disk table, and the spindle shaft by first molding the resin in the middle of the disk table, the resin having the magnetic powder mixed therein, and then magnetizing the magnetic powder in the projected stepped portion.

7. A magnetic disk drive motor comprising:

a printed board mounted on an upper surface of a frame of a magnetic disk drive and having a coil formed on a surface thereof;

a spindle shaft inserted into a through hole formed in the frame and the printed board and being supported so as to be vertical and rotatable with respect to the frame;

a rotor including a rotor case having a downward extending flange and a ringlike rotor magnet, the rotor case serving as a magnetic shielding and being mounted on the spindle shaft so that an inner surface of the downward extending flange confronts the coil on the printed board, the ringlike rotor magnet being mounted on the inner surface of the downward extending flange of the rotor case so as to also confront the coil on the printed board;

a disklike disk table having a shaft hole larger than a diameter of the spindle shaft, the disklike disk table for supporting a magnetic disk, a bearing portion formed integrally within the shaft hole of the disk table and about the shaft, the bearing portion is formed integrally with the rotor case, the disk table, and the spindle shaft by molding a resin, the resin having a magnetic powder mixed therein, the rotor case including the rotor being mounting onto the spindle shaft by the bearing on the upper side of the frame, wherein the rotor magnet is formed integrally with rotor case by first molding a resin having a magnetic powder mixed therein, and then magnetizing the magnetic powder.

8. A magnetic disk drive motor according to claim 7, wherein the disk table for supporting the magnetic disk has a chucking arm for chucking the magnetic disk, and the chucking arm is fixed by support pins; and the support pins are formed integrally with the rotor case and the disk table by molding a resin.

9. A magnetic disk drive motor according to claim 7, wherein the disk table for supporting the magnetic disk has a chucking arm for chucking the magnetic disk, and the chucking arm is fixed by support pins; and the support pins are formed integrally with the rotor case and the disk table by molding a resin.

10. A magnetic disk drive motor according to claim 7, wherein the bearing portion has a projecting stepped portion in the middle thereof, and is formed integrally with the rotor case, the disk table, and the spindle shaft by first molding the resin in the middle of the disk table, the resin having the magnetic powder mixed therein, and then magnetizing the magnetic powder in the projected stepped portion, the disk table for supporting the magnetic disk has the chucking arm for chucking the magnetic disk, and the chucking arm is fixed by support pins; and the support pins are formed integrally with the rotor case and the disk table by molding a resin.

11. A magnetic disk drive motor according to claim 7, wherein the bearing portion has a projecting stepped portion in the middle thereof, and is formed integrally with the rotor case, the disk table, and the spindle shaft by first molding the resin in the middle of the disk table, the resin having the magnetic powder mixed therein, and then magnetizing the magnetic powder in the projected stepped portion.

12. A magnetic disk drive motor comprising:

a printed board mounted on an upper surface of a frame of a magnetic disk drive and having a coil formed on a surface thereof;

a spindle shaft inserted into a through hole formed in the frame and the printed board and being supported so as to be vertical and rotatable with respect to the frame;

a rotor including a rotor case having a downward extending flange, the rotor case serving as a magnetic shielding and being mounted on the spindle shaft so that an inner surface of the downward extending flange confronts the coil on the printed board, the rotor further including a ringlike rotor magnet and an index magnet, the ringlike rotor magnet being mounted on the inner surface of the downward extending flange of the rotor case so as to also confront the coil on the printed board;

a disklike disk table having a shaft hole larger than a diameter of the spindle shaft and fixed via a bearing portion within the shaft hole to the spindle shaft on an upper side of the frame, for supporting a magnetic disk, the bearing portion is formed integrally with the rotor case, the disk table, and the spindle shaft by molding a resin, the resin having a magnetic powder mixed therein, the rotor case including the rotor being mounting onto the spindle shaft by the bearing on the upper side of the frame, wherein the index magnet detects rotation of the rotor and is disposed on an opposing surface of the downward extending flange of the rotor case with reference to the rotor magnet, the rotor magnet being shielded from the index magnet by the shielding of the downward extending flange, the index magnet being formed by first molding a resin having a magnetic powder mixed therein over an outer circumferential surface of the rotor case, and then magnetizing the magnetic powder.

13. A magnetic disk drive motor according to claim 12, wherein the rotor magnet is formed integrally with the rotor case by first molding a resin having a magnetic powder mixed therein, and then magnetizing the magnetic powder.

14. A magnetic disk drive motor according to claim 12, wherein the bearing portion has a projecting stepped portion in the middle thereof, and is formed integrally with the rotor case, the disk table, and the spindle shaft by first molding the resin in the middle of the disk table, the resin having the magnetic powder mixed therein, and then magnetizing the magnetic powder in the projected stepped portion, and the rotor magnet is formed integrally with the rotor case by first molding the resin having the magnetic powder mixed therein, and then magnetizing the magnetic powder.

15. A magnetic disk drive motor according to claim 12, wherein the disk table for supporting the magnetic disk has a chucking arm for chucking the magnetic disk, and the chucking arm is fixed by support pins, the support pins are formed integrally with the rotor case and the disk table by molding the resin, and the rotor magnet is formed integrally with the rotor case by first molding the resin having the magnetic powder mixed therein, and then magnetizing the magnetic powder.

16. A magnetic disk drive motor according to claim 12, wherein the bearing portion has a projecting stepped portion in the middle thereof, and is formed integrally with the rotor case, the disk table, and the spindle shaft by first molding the resin in the middle of the disk table, the resin having the magnetic powder mixed therein, and then magnetizing the magnetic powder in the projected stepped portion.

17. A magnetic disk drive motor according to claim 12, wherein the disk table for supporting the magnetic disk has a chucking arm for chucking the magnetic disk, and the chucking arm is fixed by support pins; and the support pins are formed integrally with the rotor case and the disk table by molding a resin.

18. A magnetic disk drive motor according to claim 14, wherein the bearing portion has a projecting stepped portion in the middle thereof, and is formed integrally with the rotor case, the disk table, and the spindle shaft by first molding the resin in the middle of the disk table, the resin having the magnetic powder mixed therein, and then magnetizing the magnetic powder in the projected stepped portion.

19. A magnetic disk drive motor according to claim 12, wherein the bearing portion has a projecting stepped portion in the middle thereof, and is formed integrally with the rotor case, the disk table, and the spindle shaft by first molding the resin in the middle of the disk table, the resin having the magnetic powder mixed therein, and then magnetizing the magnetic powder in the projected stepped portion, the disk table for supporting the magnetic disk has a chucking arm for chucking the magnetic disk, and the chucking arm is fixed by support pins; and the support pins are formed integrally with the rotor case and the disk table by molding a resin.

* * * * *